(No Model.)
M. L. UNGER.
CULTIVATOR.
No. 353,410. Patented Nov. 30, 1886.
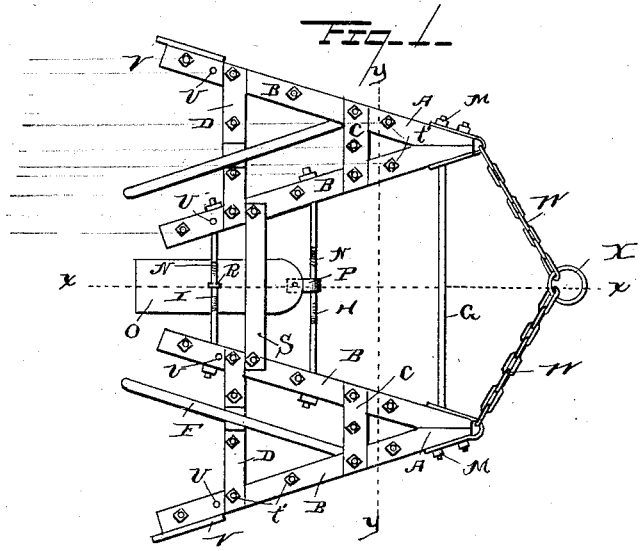
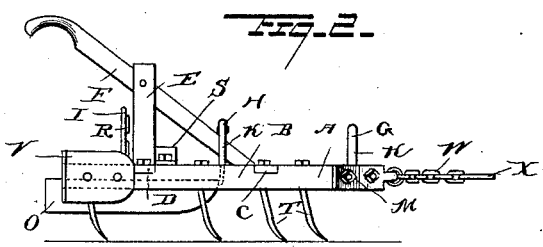
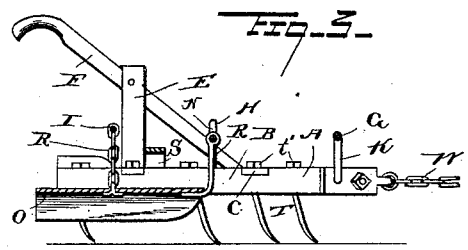
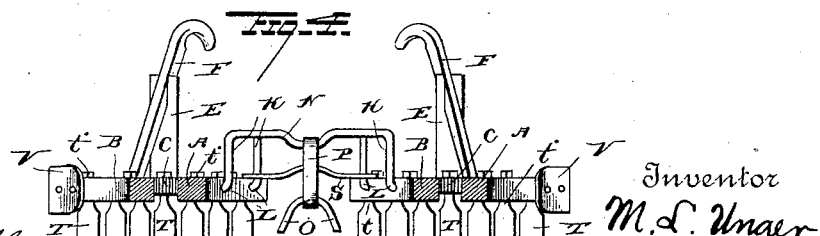
Witnesses
Wm. T. Gill
E. G. Siggers
Inventor
M. L. Unger
By his Attorneys
C. A. Knowles

UNITED STATES PATENT OFFICE.

MARTIN L. UNGER, OF NELSON, NEBRASKA, ASSIGNOR OF ONE-HALF TO A. W. MOCK, OF SAME PLACE.

CULTIVATOR.

SPECIFICATION forming part of Letters Patent No. 353,410, dated November 30, 1886.

Application filed August 31, 1886. Serial No. 212,325. (No model.)

*To all whom it may concern:*

Be it known that I, MARTIN L. UNGER, a citizen of the United States, residing at Nelson, in the county of Nuckolls and State of Nebraska, have invented a new and useful Improvement in Cultivators, of which the following is a specification.

My invention relates to an improvement in cultivators; and it consists in the peculiar construction and combination of devices that will be more fully set forth hereinafter, and particularly pointed out in the claims.

In the drawings, Figure 1 is a top plan view of a cultivator embodying my improvements. Fig. 2 is an elevation of the same. Fig. 3 is a longitudinal sectional view taken on the line *x x* of Fig. 1. Fig. 4 is a transverse sectional view taken on the line *y y* of Fig. 1.

A represents a pair of A-shaped frames, comprising the converging beams B, connected at their front ends, and the cross-beams C and D, which connect the beams B. From the center of each beam D projects a vertical standard, E. F represents handles, which have their front ends attached to the frames A, and the said handles are bolted to the upper ends of the standards, as shown.

The frames A are arranged side by side and at a suitable distance apart, and are connected by means of rods G, H, and I. The said rods have their extremities first bent downwardly at right angles to form vertical arms K, and from the lower ends of the said arms extend the horizontal shanks L, which pass through the beams of the frames A, and have their outward ends threaded to receive clamping-nuts M, to secure the rods to the frames. The rods H and I are provided at their centers with depending arms N, formed by bending the rods downwardly at that point, and from the said depending portion N is suspended a semi-cylindrical guard-runner, O, by means of a link, P, at its front end, which is attached to the arm N of the rod H, and a suspending-chain, R, which is attached to the arm N of the rod I.

S represents a transverse bar, which connects the frames A, between the rods H and I, and extends above the guard-runner, so as to keep the latter from rising above the ground.

T represents cultivating-shovels, which are attached to the beams B, C, and D of the frames. The said cultivating-shovels are provided at their upper ends with vertical spindles *t*, which pass through the beams, and on the upper ends of the said spindles are screwed clamping-nuts *t'*. Nine of these cultivating-shovels are provided for each frame, three being attached to each beam B, one to the center of each beam C and two to each beam D. One of the shovels is attached to the extreme rear end of each beam B, and in order to permit the said rear shovels to be moved forwardly on the converging beams, so as to leave a broader space between the frames for the row of plants, I provide the said beams B with supplemental vertical transverse openings U. To the rear ends of the beams B, on the outside of each frame, is attached a fender-plate, V.

W represents a draft-chain or bail, which has its extremities attached to the front ends of the frames A, and to the center of the said chain or bail is attached a ring, X, for the double-tree.

The operation of my invention is as follows: The plowman, by grasping the handles F, directs the cultivator so as to cause the frames A to run on opposite sides of the row of plants. The cultivating-teeth attached to the said frames stir and pulverize the soil on both sides of the row, and the guard-runner is drawn directly over the plants and prevents clods from being thrown upon them. The fender-plates on the outer sides of the rear ends of the frames prevent clods from being thrown upon the contiguous rows of plants.

Having thus described my invention, I claim—

1. The combination of the frames having the cultivating-teeth, and arranged side by side, the rigid transverse arched bars attached to the frames to secure them at a suitable distance apart, and the guard-runner arranged between the frames and having the rigid link P at its front end pivoted to one of the arched bars, and the chain R, suspending the rear end of the guard-runner from another of the arched bars, for the purpose set forth, substantially as described.

2. The cultivator, comprising the frames

A, arranged side by side at a suitable distance apart and connected rigidly together, the said frames having the cultivating-teeth, with the guard-runner suspended between the frames, and the fender-plates attached to the outer rear sides of the frames, for the purpose set forth, substantially as described.

In testimony that I claim the foregoing as my own I have hereto affixed my signature in presence of two witnesses.

MARTIN L. UNGER.

Witnesses:
DANIEL MINER,
J. RITTERBUSH.